Patented Jan. 5, 1954

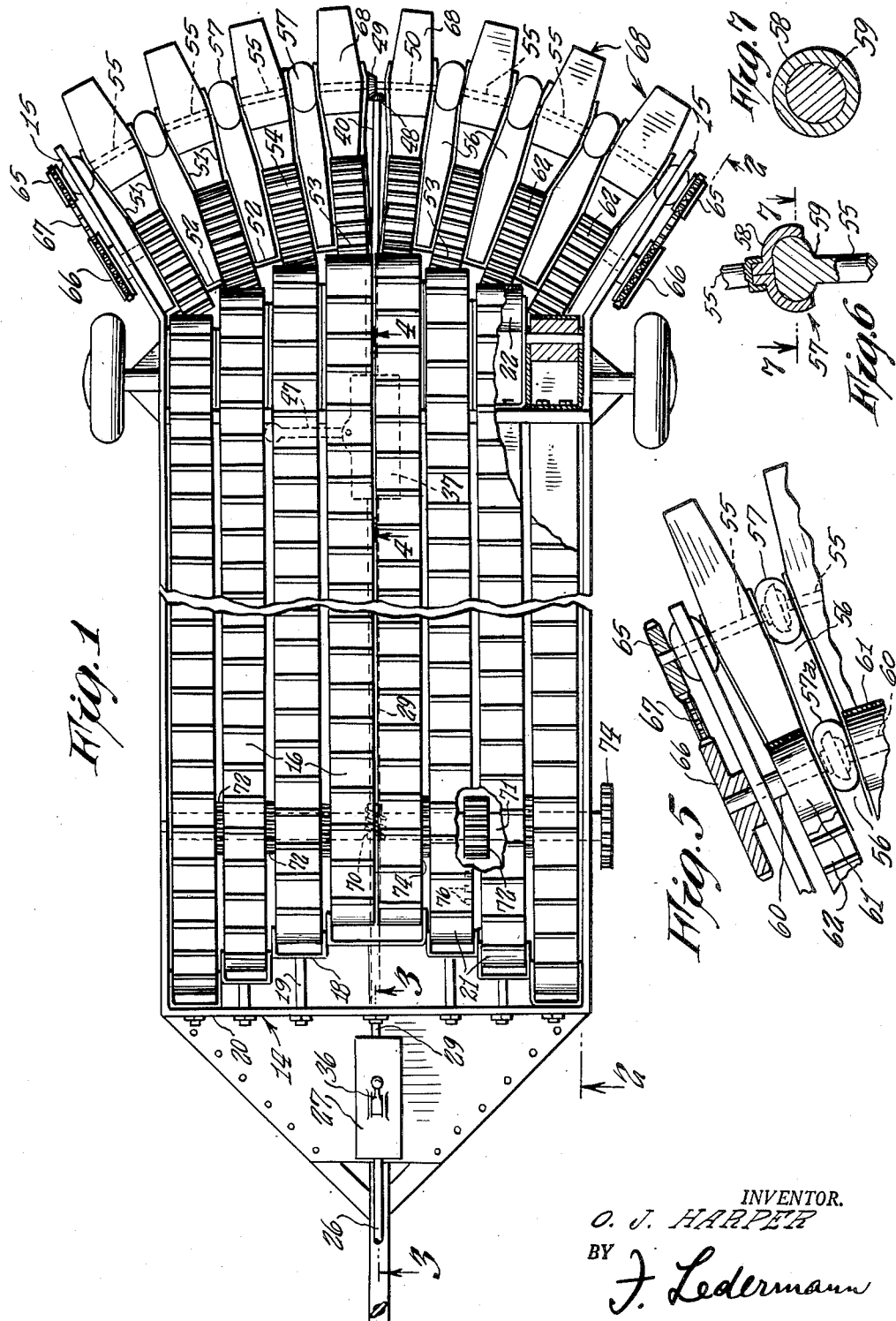

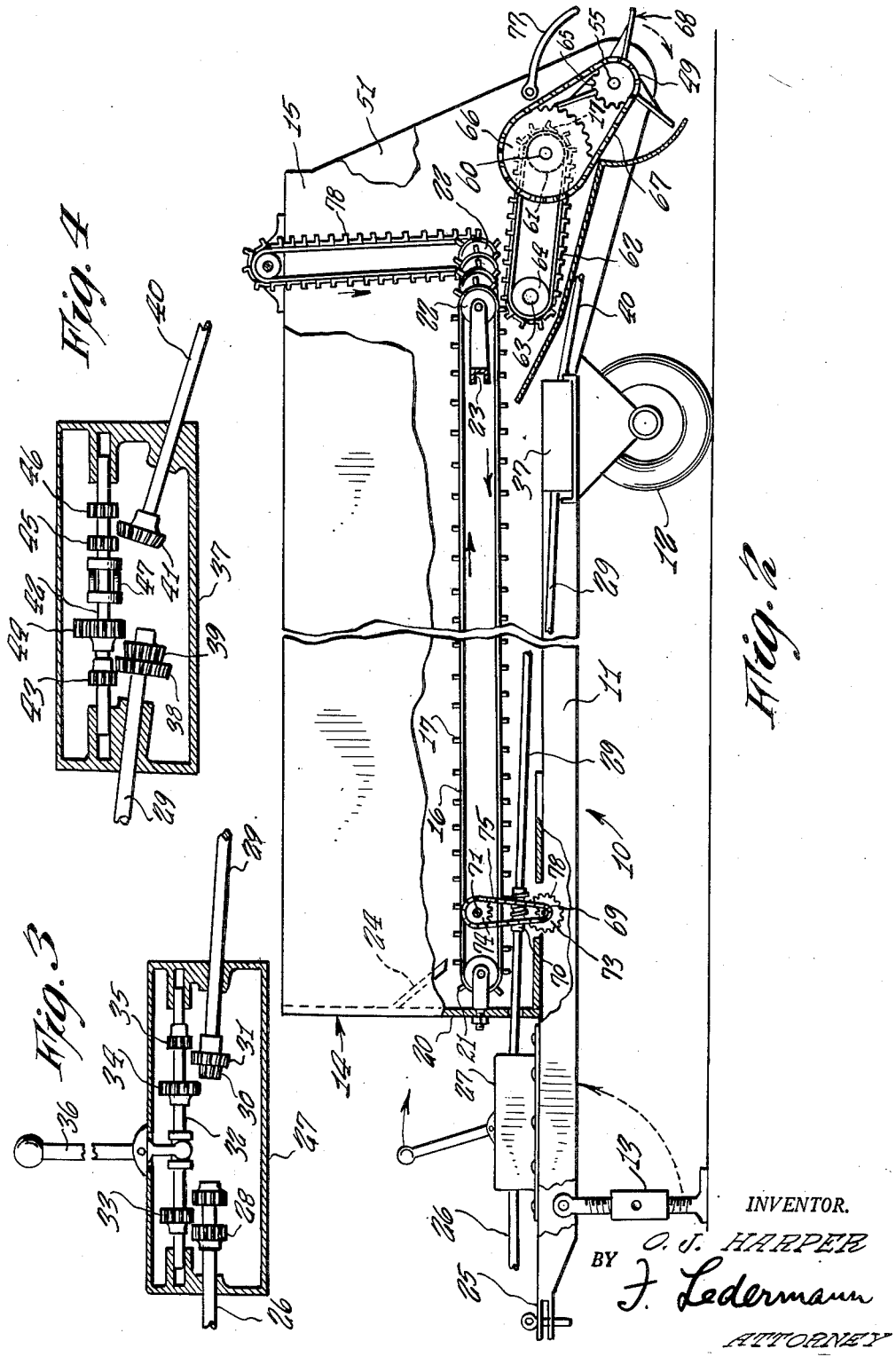

2,665,135

UNITED STATES PATENT OFFICE 2,665,135

ALL-PURPOSE FARM SPREADER

Orion J. Harper, Bicknell, Ind.

Application December 18, 1951, Serial No. 262,270

6 Claims. (Cl. 275—6)

This invention relates to that type of agricultural machinery known generically as spreaders, and an essential object thereof is the provision of a novel, useful and practical spreader having means for transmitting power to the several working parts of the spreader including both the floor conveyors which move the material rearward and the spreader paddles. This spreader is adapted to handle any material ranging between the heaviest manure to the lightest dust or fertilizer, and it is understood that in the manufacture of the machine all gears, bearings, chains, conveyors and other movable parts are to be oil sealed when possible. By means of the selective variable speed control, it is apparent that the speed or rate and quantity or density of spreading material over the soil may be accurately controlled within limits.

The above broad as well as additional and more specific objects will be clarified in the following description, wherein characters of reference refer to like-numbered parts in the accompanying drawings. It is to be understood that the drawings are intended solely for the purpose of illustration, and that it is therefore neither desired nor intended to limit the invention to any or all of the exact details of construction shown or described except insofar as they may be deemed essential to the invention.

Referring briefly to the drawings, Fig. 1 is a plan view of the spreader, the latter constituting a trailer wagon adapted to be hitched to a tractor.

Fig. 2 is a partly side elevational view of the spreader and partly a longitudinal vertical section thereof, taken on the line 2—2 of Fig. 1.

Fig. 3 is a sectional view taken on the line 3—3 of Fig. 1.

Fig. 4 is a sectional view taken on the line 4—4 of Fig. 1.

Fig. 5 is a fragmentary enlargement of the upper right-hand end portion of Fig. 1, with parts broken away and parts omitted, and partly in section.

Fig. 6 is a fragmentary plan view, with parts broken away and partly in section, of one of the plurality of covered or sealed bevel-gear shaft connections used at the rear of the machine.

Fig. 7 is a sectional view taken on the line 7—7 of Fig. 6.

Referring in detail to the drawings, the numeral 10 indicates a trailer vehicle having the main frame 11 and rear wheels 12, the front end being provided with a pivoted adjustable screw type jack stand, adapted to be swung into approximately horizontal position when the vehicle is to be moved, indicated at 13. The frame 11 supports a box type of vehicle having the divergent wings 15 extending from the opposed side walls of the box body 14, at the rear end of the latter.

Above the frame 11, the floor of the box 14 is formed of a plurality of longitudinal conveyor belts 16. In order to provide greater agitation of the material worked upon, some or all of the conveyor belts used are preferably of the link belt type having pivoted hook-like cogs, the same being of standard construction; these cogs are shown at 17. Rods 19 extending rearward through the front wall 20 of the box 14 and provided with yokes 18, support pulleys 21 about which the belts 16 are trained. Similar pulleys 22 at the rear, over which the belts 16 pass, are supported in any desired manner, as to frame members 23. A sloping board 24 is provided extending from the front wall 20, to guide material onto the belts 16, in the usual manner. A hitch 25 is provided so that the vehicle may be drawn by a tractor.

A drive shaft 26 extends forward from a transmission box 27, the said shaft being adapted to be connected to the usual power take-off shaft of the tractor. Within the housing 27, the end of the shaft 26 has two spaced pinions 28 of like diameter. A second shaft 29 passes into the housing through the rear, and has on its end in the housing spaced gears 30 and 31 of relatively increasing diameter, in the form of bevel gears. A longitudinally slidable shaft 32 is supported within the housing above the ends of the shafts 26 and 29, and has at its left (Fig. 3) a gear 33 adapted to mesh with either of the gears 23 and at its right spaced gears 34 and 35, the latter smaller than the former, adapted to be engaged respectively with the pinion 30 and the gear 31. A lever 36 is provided to move the shaft 32 as desired. Without going into further detail, it is obvious that with constant speed of rotation of the drive shaft 26, the speed of rotation of the shaft 29 may be varied between two stages.

The shaft 29 extends rearward into a second transmission housing 37 supported by the frame 11 near the rear of the vehicle, and within this housing it has on its end a relatively larger bevel gear and a relatively smaller bevel gear, indicated at 38 and 39, respectively. A shaft 40 extends through the rear of the housing 37 and has on its end within the housing 37 a bevel gear 41. A longitudinally slidable shaft 42 is supported within the housing 37 above the said shaft ends, and has on its left (Fig. 4) spaced gears 43 and 44, the former smaller than the latter. The shaft 42 also has, on its right, spaced gears 45 and 46. A gear shift lever 47 extends horizontally from the side wall of the housing 37, adapted to engage the shaft 40 with either gear 45 or 46 and at the same time to engage either the gear 43 with the gear 38 or the gear 44 with the gear 39. Thus, again, it is obvious that constant rotation of the shaft 29 may cause either of two different speeds of rotation of the shaft 40.

The shaft 40 extends rearward and downward and has on its outer end a bevel gear 48 in mesh with a bevel gear 49 on a transverse shaft 50. At the rear of the box 14, between the wings 15, spaced walls 51 may be provided in fanwise relationship, all vertical and having the same or approximately the same profile as the wings 15. Each pair of mutually adjacent walls 51 is spaced from the next adjacent pair of such walls by an end wall 52 at the front ends of the walls 51, thus dividing the rear wall of the box 14 into a plurality of separate passages 53 therethrough each extending vertically from the conveyor belt floor 16 to the top of the box 14, and each passage 53 thus leads into what may be termed a floorless chute defined by an adjacent pair of the walls 51. However, a floor is provided for each chute in the form of a conveyor belt 54, as described below.

The shaft 50 is rotatably supported in opposed walls 51, adjacent a vertical longitudinal plane through the middle of the vehicle. On either side of the said plane, additional shafts 55 are supported in walls 51 and are lined up with the shaft 50 to be rotated synchronously therewith and thereby. The shafts 55 adjacent the ends of the shaft 50 are connected to the latter and to each other in the manner illustrated in Figs. 5, 6 and 7, but in order to avoid repetition such connections are illustrated only for two adjacent shafts 55. In the vertical spaces 56 which occur between the passages 53, that is, the chutes abovementioned, the mutually adjacent ends of two shafts 55 are connected as follows, by means of a unit 57. A cup 58 is rigid on the end of one shaft 55 and a head 59 is rigid on the other shaft 55, and the head 59 registers loosely in the cup 58, so that the connection functions in the manner of a universal joint. Any other suitable interconnecting means for the said shafts may of course be provided.

In each chute space between walls 51, positioned in a direction forward from the shafts 50 and 55 and supported in adjacent walls 51, shafts 60 are mounted, each shaft 60 being parallel with a shaft 55 or the shaft 50 which is mounted in the same space. Pulleys 61 are rigid on shafts 60, and a conveyor belt 62 is trained about each pulley 60. For each belt 62 there is a pulley 64 on a shaft 63, the latter being positioned coaxial with the pulley 61 just forward of the rear end of a corresponding floor belt 16, there being one belt 62 for each belt 16. This is illustrated for but one such belt 62 in Fig. 2, but it is clear from Fig. 1 that there are as many belts 62 as belts 16, one of the former for and positioned just under each of the latter. The various shafts 60 are interconnected in the same manner as the shafts 55, that is, by means of units 57a similar to the units 57, positioned in the spaces 56 between walls 51.

The outer extreme shafts 55 which extend through the wings 15, have sprockets 65 thereon, and the corresponding outer extreme shafts 60 have sprockets 66 thereon, each sprocket 65 having a chain 67 trained about it and its corresponding or adjacent sprocket 66. It is thus apparent that when the shaft 40 rotates shaft 50 and hence shafts 55, the shafts 60 will be simultaneously rotated thereby moving the conveyors 62. In each of the chute-like outlets from the passages 53, each of the shafts 55, as well as the shaft 50, is provided with paddles 68 adapted to throw outward the material deposited thereon by the belts 62.

Near the forward end of the box 14, a transverse shaft 69 is rotatably supported in the frame, below the shaft 29. The latter is provided with a worm 70 meshing with a worm gear 78 on the shaft 69. Above the shaft 69 and between the upper and lower sides of the belts 16, a second transverse shaft 71 is rotatably mounted. One end of each shaft 69 and 71 is shown projecting outside the frame 11; on the said end the shaft 69 has a sprocket 73 and the shaft 71 has a sprocket 74. A chain 75 is trained about these sprockets. This arrangement provides the driving means for the belts 16 through the medium of a walking chain or sprocket which may be provided, merely by way of example, as follows. Spaced toothed wheels or sprockets 72 are provided on the shaft 71, as many as needed and positioned on the shaft 71 so as to cause the latter to drive the belts 16, the teeth of the wheels 72 being successively engageable with complementary recesses 76 in the undersurfaces of the belts 16. However, any other similar or suitable means may be provided through which the shaft 69 drives the shaft 71 and the latter drives the belts 16.

A hood or apron 77 may be provided over each paddle 68 to keep the material being discharged as near the ground as possible. A vertical spreader 78 is shown in Fig. 2, at the rear of the box 14, and this may be connected by any standard means, not shown, with any convenient adjacent shaft to drive the same. One such spreader may be provided for and at the end of each belt 16.

It is apparent from the above that an assortment of speeds of rotation are available in the shaft 40 at constant speed of the shaft 26, two various speeds being available for the shaft 29 by means of the transmission in the housing 27 and four being available to the spreader paddles 68. Arrows in Fig. 2 indicate directions of rotation or movement of the various parts in operating the machine to spread material.

Obviously, modifications in form or structure may be made without departing from the spirit or scope of the invention.

I claim:

1. A spreader comprising a vehicle having a frame, a box-like body on the frame, a plurality of longitudinal conveyor belts lying in a common plane at the bottom of the body and providing a floor for the body, said body including side walls having wings extending rearwardly and downwardly, a second and like plurality of conveyor belts positioned below said first conveyor belts and extending rearwardly thereof between said wings to receive material from said first conveyor belts, a plurality of shafts joined end to end rotatably mounted between said wings below the level of said second conveyor belts and rearward thereof, said shafts having a like plurality of spreader paddles thereon positioned in the same vertical planes as said second conveyor belts to receive material from the latter, and means for moving all of said conveyor belts and rotating said paddles in the same clockwise direction, said means comprising a drive shaft on the front of the vehicle adapted to be connected to a power shaft, a transmission housing at the front of the vehicle, said drive shaft extending into the housing through the front thereof, a second shaft having the front end thereof in said housing and extending through the rear of the housing and under said floor, means connecting said second shaft with said first conveyor belts for driving the latter upon rotation of said second shaft, means connecting said second shaft with one of said plurality of shafts for driving said plurality of shafts, and means connecting said plurality of shafts with said second conveyor belts for driving said second conveyor belts.

2. A spreader comprising a vehicle having a frame, a box-like body on the frame, a plurality of longitudinal conveyor belts lying in a common plane at the bottom of the body and providing a floor for the body, said body including side walls having wings extending rearwardly and downwardly, a second and like plurality of conveyor belts positioned below said first conveyor belts and extending rearwardly thereof between said wings to receive material from said first conveyor belts, a plurality of shafts joined end to end rotatably mounted between said wings below the level of said second conveyor belts and rearward thereof, said shafts having a like plurality of spreader paddles thereon positioned in the same vertical planes as said second conveyor belts to receive material from the latter, and means for moving all of said conveyor belts and rotating said paddles in the same clockwise direction, said means comprising a drive shaft extending longitudinally from the front of the vehicle adapted to be connected to a power shaft, a housing on the front of the vehicle, said drive shaft extending into said housing and having the rear end thereof in said housing, a second shaft having one end in the housing and extending rearward through the housing, a variable transmission in said housing including gears on said drive shaft and said second shaft, means connecting said second shaft with said first conveyor belts for driving said first conveyor belts upon rotation of said second shaft, a second housing at the rear of the vehicle, said second shaft having the rear end thereof positioned in said second housing, a third shaft extending rearward and downward from said second housing and having a bevel gear thereon on the rear end thereof and having the front end thereof in said second housing, one of said plurality of shafts having a bevel gear thereon in mesh with said first-named bevel gear, a variable transmission in said second housing including gears on the said second and third shafts, and means connecting said plurality of shafts with said second conveyor belts for driving the latter upon rotation of said plurality of shafts.

3. A spreader comprising a vehicle having a frame, a box-like body on the frame, a plurality of longitudinal conveyor belts lying in a common plane at the bottom of the body and providing a floor for the body, said body including side walls having wings extending rearwardly and downwardly, a second and like plurality of conveyor belts positioned below said first conveyor belts and extending rearwardly thereof between said wings to receive material from said first conveyor belts, a plurality of shafts joined end to end rotatably mounted between said wings below the level of said second conveyor belts and rearward thereof, said shafts having a like plurality of spreader paddles thereon positioned in the same vertical planes as said second conveyor belts to receive material from the latter, and means for moving all of said conveyor belts and rotating said paddles in the same clockwise direction, said means comprising three longitudinally spaced longitudinal shafts, the first of said longitudinal shafts extending forward from the vehicle and being adapted to be connected to a power shaft, the second of said longitudinal shafts having means thereon connected with said first conveyor belts for driving the same, the third of said longitudinal shafts having means connecting the same with one of said plurality of shafts for driving the latter, a variable speed transmission mounted at the front of the vehicle between and adapted to interconnect said first and second of said longitudinal shafts, a second variable speed transmission mounted at the rear of the vehicle between said second and third of said longitudinal shafts and adapted to interconnect said second and third longitudinal shafts, and means connecting said plurality of shafts with said second conveyor belts for driving the second conveyor belts.

4. The spreader set forth in claim 1, said body having a rear wall, said rear wall having vertical passages therethrough, each of said passages lying substantially in the same vertical plane as one of said first conveyor belts, spaced side walls extending rearward from each of said passages thereby providing chute-like outlets from said passages, each of said second conveyor belts lying under one of said passages to receive material passed therethrough and extending into one of said outlets, each of said paddles being positioned in one of said outlets.

5. The spreader set forth in claim 1, said wings extending divergently outward from said side walls, said second conveyor belts extending rearwardly in diverging relation from the longitudinal center line of the body, the inner end of each of said second conveyor belts being positioned in the same vertical plane as the outer end of one of said first conveyor belts.

6. The spreader set forth in claim 1, said wings extending divergently outward from said side walls, said second conveyor belts extending rearwardly in diverging relation from the longitudinal center line of the body, the inner end of each of said second conveyor belts being positioned in the same vertical plane as the outer end of one of said first conveyor belts, the rear ends of said first conveyor belts being positioned increasingly farther rearward beginning with each thereof at a side of the vehicle and ending with each thereof adjacent said longitudinal center line of the vehicle.

ORION J. HARPER.

References Cited in the file of this patent

UNITED STATES PATENTS

| Number | Name | Date |
|---|---|---|
| 1,007,493 | Ryder | Oct. 31, 1911 |
| 1,259,739 | Hinkle | Mar. 19, 1918 |
| 1,264,409 | McDonald | Apr. 30, 1918 |
| 1,280,674 | Crom | Oct. 8, 1918 |
| 1,326,163 | Aamodt | Dec. 30, 1919 |
| 1,648,658 | Nirider | Nov. 8, 1927 |
| 2,221,401 | Konicek | Nov. 12, 1940 |
| 2,281,212 | Stolzfus | Apr. 28, 1942 |
| 2,453,714 | Lapointe | Nov. 16, 1948 |
| 2,549,876 | Williamson | Apr. 24, 1951 |